United States Patent [19]

Legare, III

[11] Patent Number: 4,943,377
[45] Date of Patent: Jul. 24, 1990

[54] METHOD FOR REMOVING DISSOLVED HEAVY METALS FROM WASTE OILS, INDUSTRIAL WASTEWATERS, OR ANY POLAR SOLVENT

[75] Inventor: Thomas G. Legare, III, Lake Mary, Fla.

[73] Assignee: Environmental Technology (U.S.), Inc., Sanford, Fla.

[21] Appl. No.: 190,875

[22] Filed: May 6, 1988

[51] Int. Cl.$^5$ .............................................. C02F 1/52
[52] U.S. Cl. .................................... 210/709; 208/179; 208/251 R; 210/716; 210/725; 210/912; 210/914; 423/1; 423/43; 423/92
[58] Field of Search ............... 208/180, 251 R, 179, 208/181; 210/702, 705, 719, 720, 721, 722, 723, 724, 725, 727, 728, 729, 757, 758, 754, 756, 760, 904, 912-914, 709, 716; 423/11, 22, 34, 50, 55, 65, 85, 92, 101, 115, 140, 508, 509, 561 R, 561 B

[56] References Cited

U.S. PATENT DOCUMENTS

| | | | |
|---|---|---|---|
| 4,329,224 | 5/1982 | Kim | 210/709 |
| 4,405,462 | 9/1983 | Kamperman | 210/709 |
| 4,612,125 | 9/1986 | Elfline | 210/912 |
| 4,678,584 | 7/1987 | Elfline | 210/719 |

Primary Examiner—Peter Hruskoci
Attorney, Agent, or Firm—Robert M. Skolnik

[57] ABSTRACT

Precipitation (conversion) of dissolved heavy metals in waste effluents is achieved with the addition and mixing of a solution of sodium polythiocarbonate with a solution containing dissolved heavy metals. The solution of sodium polythiocarbonate has been pH buffered to a pH of 12.5 or less in the manufacturing process. Precipitation of the dissolved heavy metals with the buffered sodium polythiocarbonate is complete by the formation of a stable, unleachable [as defined in 40 CFR 190.01, Part 261 Appendix II (Code of Federal Regulations)], extremely insoluble metallic polythiocarbonate particle.

3 Claims, 2 Drawing Sheets

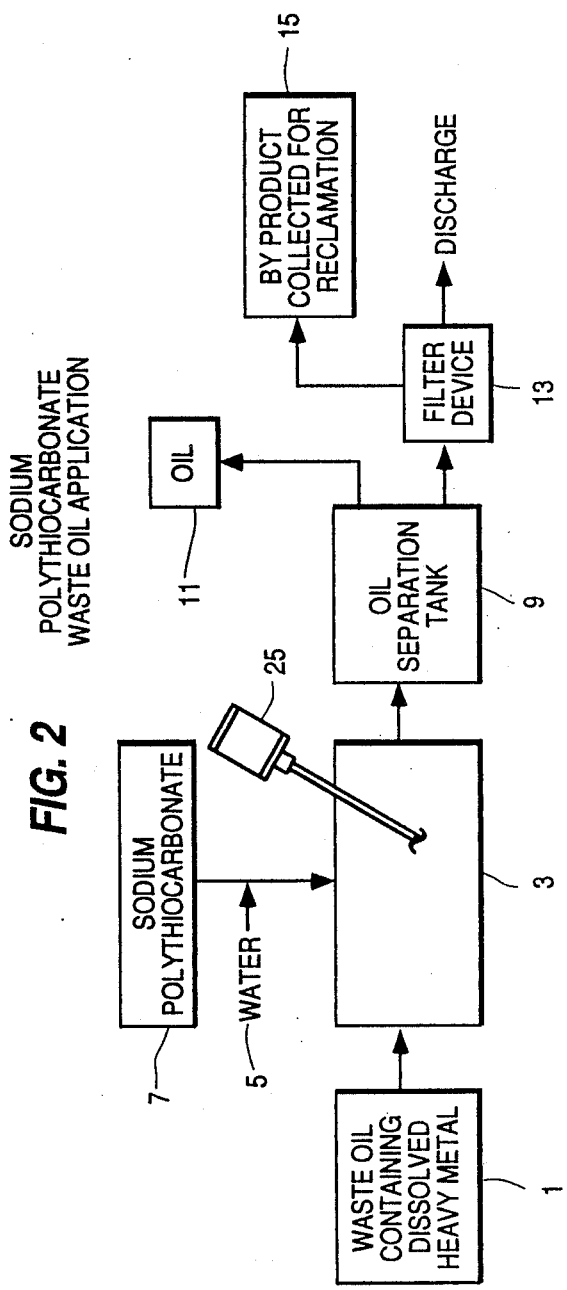

METHOD FOR REMOVING DISSOLVED HEAVY METALS FROM WASTE OILS, INDUSTRIAL WASTEWATERS, OR ANY POLAR SOLVENT

FIELD OF THE INVENTION

This invention relates to a method for pollution control and abatement in the treatment of liquids containing dissolved heavy metals. The method embodies the precipitation and separation of dissolved heavy metals from polar solvents, industrial wastewaters, or waste oils.

The method is useful in the following applications:
1. Removal of dissolved heavy metals from industrial wastewaters;
2. Stabilization of hazardous waste dump sites to prevent continual leaching of dissolved heavy metals in the ground water;
3. Removal of dissolved heavy metals from waste oils;
4. Conversion of hazardous metal hydroxides into a non-hazardous material;
5. Protection of digestors in publicly or privately owned treatment works by conversion of dissolved heavy metals into non-leachable sludges;
6. Reduction of chlorine in industrial wastewaters and/or waste oils to chlorides;
7. Precipitation of metals from very tightly bound chelators or sequestering agents;
8. Conversion of hazardous metal sludges through a secondary process into a non-hazardous by-product which has potential value as a reclaimable resource.

DESCRIPTION OF THE PRIOR ART

Precipitation and removal of dissolved heavy metals from effluent wastewaters has and is being achieved by several conventional methods all of which generate a sludge that must be classified as hazardous. This sludge must be secured in a designated hazardous landfill. This disposal method is a lengthy process and legal liabilities are assumed by the waste generator and the waste disposer with this hazardous waste.

Some of the conventional methods in use are precipitation by pH adjustment with sodium hydroxide; assisted (with Ferrous sulfate addition) sodium hydroxide precipitation; and precipitation with sodium dimethyldithiocarbamate, sodium sulfide, or lime. There are several other methods employed which include, reverse osmosis, electroplating, absorption, etc. which either generate a sludge, a solution, or other by-product that is classified as hazardous.

These prior art methods are disclosed and discussed in U.S. Pat. Nos. 4,169,053, issued Sept. 25, 1979, Heavy Metal Removal with Ferite Crystals; 4,260,493, issued Apr. 7, 1981, Treatment of Waste Exectroless Copper Solutions; 4,329,224 issued May 11, 1982, Precipitation of Heavy Metals with Calcium Sulfide; and 4,278,539, issued July 14, 1981, Precipitation of Heavy Metals as Sulfides.

SUMMARY OF THE INVENTION

In the method of the invention, precipitation (conversion) of the dissolved heavy metals is achieved with the addition and mixing of a solution of sodium polythiocarbonate with a solution containing dissolved heavy metals. The solution of sodium polythiocarbonate has been pH buffered to a pH of 12.5 or less in the manufacturing process. Precipitation of the dissolved heavy metals with the buffered sodium polythiocarbonate is complete by the formation of a stable, unleachable [as defined in 40 CFR 190.01, Part 261 Appendix II (Code of Federal Regulations)], extremely insoluble metallic polythiocarbonate particle.

The progress of the reaction is monitored and controlled with an electrode/millivolt control system which is responsive to the two sulfur atoms in the polythiocarbonate ion which have accepted an extra electron and have a $-1$ electronic valence charge on each atom. This control system is disclosed and claimed in the copending application of THOMAS G. LEGARE, III, Ser. No. 190,774, entitled ELECTRODE CONTROL SYSTEM commonly assigned, filed of even date herewith.

Removal of the precipitated metallic polythiocarbonate particle(s) from polar solvent solutions can be achieved by gravity or assisted gravity settling end/or filtration. The method for removal of dissolved metals in waste oil is accomplished by thorough mixing or a solution of sodium polythiocarbonate with the oil. Once thoroughly mixed, the oil layer and the aqueous layer are allowed to separate. The oil is skimmed and the aqueous layer containing the precipitated metallic polythiocarbonates is filtered or settled for removal. Completion of these steps render the treated solution void of any heavy metal species.

Adding a solution of sodium polythiocarbonate to a solution containing free chlorine atoms will reduce the chlorine to chloride and has the potential to reduce hexavalent chromium to the trivalent chromium state.

Accordingly, several objects of my invention are as follows:

The principal object of this invention is the provision of a method precipitates dissolved heavy metals and produces a resultant by-product which has commercial value and has an commercial demand.

Because of the unique chemical bonding of metal atoms to the polythiocarbonate molecule, an extremely stable, very dense metallic polythiocarbonate is formed. Stability of the metallic polythiocarbonate is maintained by the single double bonded sulfur to carbon link and the two single sulfur-sulfur to metal bond links as shown below:

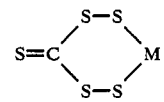

where
S=Sulfur
C=Carbon
M=Metal

The sability of the metallic polythiocarbonate is the reason the sodium polythiocarbonate is very effective in removing and precipitating tightly bound chelated metals from solution.

sodium polythiocarbonate also provides usefulness as a reducing agent because of its extremely low oxidation-reduction potential. This advantage can be used in conjunction with its use as an effective precipitant for reducing chlorine to chloride, persulfate to sulfate or peroxide to oxygen and others.

As mentioned earlier, the metallic polythiocarbonte by-products which are formed have a desireable commercial value for use in the manufacture of wood preservatives, smelting to copper metal, and other processes which generate salts of copper, lead, nickel, etc. for industry. These markets already exist.

It has been demonstrated, in practice, that rapid and violent mixing (mixing with a 1725 RPM mixer for 10 minutes) of aqueous sodium polythiocarbonate with waste oil containing dissolved heavy metals effectively removes the dissolved metals from the oil. The precipitated metallic polythiocarbonates are moved to the aqueous phase and can be removed by conventional filtration methods. The waste oil now devoid of dissolved heavy metals can ecologically be burned as fuel without venting the metals to the atmosphere.

Another object of my invention is the reduction to an ecologically safe treated effluent which can be discharged.

A further object and advantage of my invention is the production of metallic polythiocarbonate by-products which are recyleable and not land fill disposable.

A still further object of my invention is that waste oils treated with the invention can be burned as fuel without release of metals into the atmosphere.

A still further object and advantage of the invention is the reduction of oxidizers in the waste stream discharged after treatment in accordance with my invention.

Another object of my invention is the elimination of legal liabilities as the metallic polythiocarbonate by-products are a commercial commodity and a resource.

A still further object of this invention is the provision of a treatment process has a high metal to by-product conversion ratio.

These objects are accomplished with a process which is economically advantageous to employ.

BRIEF DESCRIPTION OF THE DRAWINGS

These as well as further objects and advantages of the invention will become apparent to those skilled in the art from a review of the following detailed specification of my invention, reference being made to the accompanying drawing in which:

FIG. 2 is a block diagram of the steps involved in applying my invention to waste oil treatment.

DETAILED DESCRIPTION OF THE INVENTION

Figure 1:
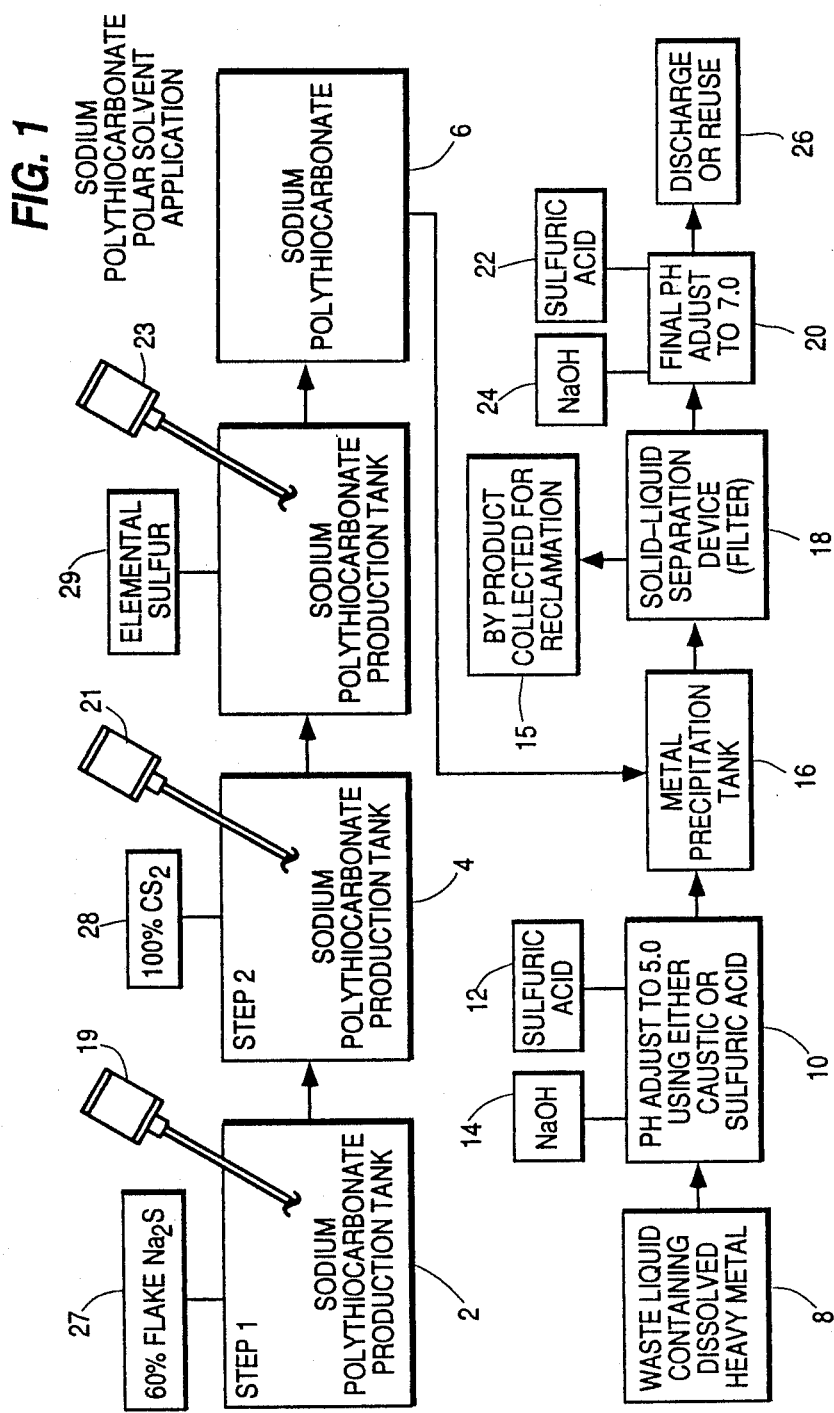
FIG. 1 is a block diagram of the steps in the process of my invention applied to polar solvent treatment.

In accordance with my invention, I have found that a waste solution containing dissolved heavy metals can effectively, efficiently, and economically be treated with a solution of sodium polythiocarbonate. Treatment with polythiocarbonate results in precipitation of the dissolved heavy metals as a metallic polythiocarbonate and the metallic polythiocarbonates can be removed from solution by filtering, gravity settling, or absorption. The selection of a method of removal is a matter of choice within the skill of the art.

In carrying out the method of my invention, a waste solution containing dissolved heavy metals is contained in a suitable reaction vessel. With slow stirring, the solution is pH adjusted to $5.0 \pm 0.5$ with either caustic or an acid. Once the pH is adjusted the sodium polythiocarbonate is slowly added until a one to two milligram per liter excess of polythiocarbonate is sensed. This excess is sensed and controlled with the control system disclosed and claimed in my aforementioned copending application Ser. No. 190,774, filed of even date herewith. As illustrated in the following table, I have determined that the excess should be maintained for 10-20 minutes prior to the separation step.

| REACTION TIME | |
|---|---|
| Time In Minutes | % Copper Removed |
| 0.00 | 0.0 |
| 0.50 | 85.0 |
| 1.00 | 93.0 |
| 2.00 | 98.0 |
| 4.00 | 98.8 |
| 8.00 | 99.0 |
| 10.00 | 99.5 |
| 15.00 | 99.9 |

Once complete conversion of all dissolved metals to metallic polythiocarbonates is accomplished, the separation step becomes the determining factor in effective removal; i.e. the better the filtration/settling system, the better the removal.

The treatment process of the invention has been determined to be a very effective method of removing chelated and non-chelated dissolved heavy metals from solution. Complete precipitation of copper, lead, nickel, silver, cadmium, mercury and iron has been assessed. The efficiency, simplicity, economic and ecologic gains, and legal benefits contribute to this desirable process.

The following examples are useful in understanding my invention.

EXAMPLE 1

In order to determine the effectiveness of sodium polythiocarbonate in precipitating copper-lead from a solution, one liter of a 100 milligram per liter copper-lead standard solution was prepared. The comparative results with hydroxide precipitation are compared in the following table. All treatments effectively precipitated copper.

TABLE 1

| | Ionic Metal Conc. in ppms | | |
|---|---|---|---|
| Sample | pH ($\pm 0.5$) | Copper | Lead |
| A Sample | 3.0 | 100 | 100 |
| B NaOH | 8.5 | 0.02 | <0.1 |
| C NaOH + DTC* | 8.5 | <0.02 | <0.1 |
| D NaOH + Sulfide | 8.6 | <0.02 | <0.1 |
| E NaOH + Polythiocarbonate | 5.5 | <0.02 | <0.1 |

*DTC = Sodium Dimethyldithiocarbamate

EXAMPLE 2

To determine the effectiveness of sodium polythiocarbonate in precipitating a chelate copper from solution, one liter of a 100 milligram per liter copper-lead solutions was prepared and one gram of Ethylenediaminetetraacetate (EDTA) was added and dissolved. The pH raised to $8.0 \pm 0.1$. The comparative results are shown in Table 2.

TABLE 2

| | Ionic Metal Conc. in ppms | | |
|---|---|---|---|
| Sample | pH ($\pm 0.1$) | Copper | Lead |
| A Sample | 8.0 | 100 | 76 |
| B NaOH | 8.5 | 100 | 72 |
| C NaOH + DTC* | 8.6 | 0.03 | <0.1 |
| D NaOH + Sulfide | 8.5 | <0.02 | <0.1 |

TABLE 2-continued

| | | Ionic Metal Conc. in ppms | |
|---|---|---|---|
| Sample | pH (±0.1) | Copper | Lead |
| E Polythicarbonate | 8.0 | <0.02 | <0.1 |

*DTC = Sodium Dimethyldithiocarbamate

In the above examples, a 200 milliliter aliquot was taken from the 100 milligram per liter copper-lead standard solutions and transferred into a 400 milliliter glass breaker. A magnetic, TEFLON ® coated stir bar was placed in the beaker and the beaker placed on a laboratory magnetic stirrer. The solution was gently stirred. Temperatures of all solutions were ambient (72° F.). The pH was monitored with a standard pH meter and a double junction combination pH electrode. The pH was adjusted to the values shown by slow addition (dropwise) of a 0.001 Normal Sodium Hydroxide solution. The samples with sodium polythiocarbonate, sodium dimethyldithiocarbamate and sodium sulfide added were done slowly by adding the reagent dropwise until a −180 and −300 millivolt reading was recorded using the electrode control system of my aforementioned copending application filed of even date herewith. Once all reagents were added, the solutions were gently stirred for 10 minutes (in accordance with the reaction time table, above). The solutions were then filtered separately through a 1.7 micron glass filter paper and analyzed by Atomic Absorption Spectrophotometry for remaining copper and lead.

EXAMPLE 3

An economic analysis was performed based on the retail prices of all the reagents. The results of this analysis are set forth in Table 3. The analysis does not include sludge handling costs or adjustment for economic gains based on the sale of the polythiocarbonate by-product.

TABLE 3

| | Economic Analysis | |
|---|---|---|
| | Per 1000 Gallons Non-Chelated | Per 1000 Gallons Chelated |
| NaOH | 0.21 | Not effective |
| NaOH + DTC* | 0.26 | 0.26 |
| NaOH + Sulfide | 0.22 | 0.22 |
| NaOH + Polythiocarbonate | 0.215 | 0.215 |
| Polythiocarbonate | 0.16 | 0.05 |

*DTC = Sodium Dimethyldithiocarbamate

The economic advantages are favorable for the polythiocarbonate treatment process even without the favorable consideration being given to revenue derived from sale of the sludge.

A further explanation of the method and process of my invention may be had by referring to FIGS. 1 and 2. FIG. 1 shows a block diagram flow chart of the steps involved in treating polar solvents. In FIG. 1, the production of sodium polythiocarbonate is illustrated in steps 2, 4, 17 and 6. Block 2 illustrates the step of mixing 60% sodium sulfide flake ($Na_2S$) 27 in a stainless steel mixing tank. A volume of water is added to the tank with the sodium sulfide at an amount of one pound per gallon of water. This is mixed with a 1725 RPM mixer 19 until the sulfide flake is completely dissolved.

In the next step designated as block 4, carbon disulfide 100% ($CS_2$) is added to the solution prepared in block 2. The carbon disulfide is added at an amount of 0.033 gallons carbon disulfide per gallon if prepared solution. This is mixed with a 1725 RPM mixer 21 until all the carbon disulfide has reacted. The reaction of the carbon disulfide is determined visually.

In the next step, diagrammatically illustrated in block 17, elemental sulfur 29 is added to the reaction mixture from block 4 at a rate of one pound per gallon and is mixed with a 1725 RPM mixer until completely reacted. This step results in the formation of sodium polythiocarbonate. The reaction proceeds at 50°–160° F.

The reaction is:

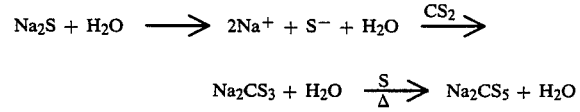

$$Na_2S + H_2O \longrightarrow 2Na^+ + S^- + H_2O \xrightarrow{CS_2}$$

$$Na_2CS_3 + H_2O \xrightarrow[\Delta]{S} Na_2CS_5 + H_2O$$

The wastewater to be treated is collected in block 8 in a suitable reaction tank. The solution is constantly stirred with a suitable mixer motor. The first step is to adjust the pH of the wastewater solution either up or down to 5.0±0.5 by the addition of liquid caustic soda NaOH 14 of sulfuric acid 12. The pH adjustment is done either automatically or manually by using a pH meter and pH electrode. Once the pH is stabilized, a solution of sodium polythiocarbonate is added to the pH adjusted waste waters in tank 16 to a −300 millivolt reading. This is typically done automatically with the electrode control system disclosed and claimed in my copending application Ser. No. 190,774, filed of even date herewith. The solution is mixed for 10 minutes to insure complete precipitation and a cationic flocculant added to aid settling. The solution can then be filtered and the solids are separated from the liquid in filtering step 18. The solid by product is collected in step 15. The separated liquid is pH adjusted to approximately 7.0 in step 20 using NaOH 24 or sulfuric acid 22. The pH adjusted liquid is then available for discharge or re-use 26.

FIG. 2 diagrammatically illustrates the steps in the treatment of waste oil containing heavy metal. A quantity of waste oil is collected in a suitable container shown at step 1. Sodium polythiocarbonate 7 (prepared in the manner of steps 1, 4, 17 and 6 of FIG. 1) is mixed with the waste oil and tap water 5 in a tank 3. The water is added in equal volume to the sodium polythiocarbonate 7 necessary to precipitate the metals contained in the oil. The volume in milliliters of a 25% sodium polythiocarbonate solution required to be added is equal to the product of the total ppm of the metals in the oil multiplied by the number of gallons of oil multiplied by 0.04 (a constant based on the atomic weight of copper).

More specifically, the 25% sodium polythiocarbonate solution=255 milligrams sodium polythiocarbonate (SPTC) per milliliter. Therefore, the constant 0.04 may be derived as follows:

(mg copper/liter) × (3.784 liters/gallon) × (#gallons) ×

(172 AMU polythiocarbonate/64 AMU copper) ×

(1 milliliter/255 mg SPTC) = 0.04

The atomic weight of copper was chosen empirically as an average representative of the atomic weights of the metals of concern in the waste oils under treatment.

The total ppm of the metals in the oil may be determined using known techniques such as inductively coupled plasma (ICP) atomic absorption or an emission spectrophotometer.

The oil/water sodium polythiocarbonate layers are rapidly mixed with a 1725 RPM mixer motor 25 for 10 minutes, then allowed to remain static (in block 9) so the oil and aqueous layer separate. The oil and solids separated in step 9 where the oil is skimmed off or otherwise separated in step 11 and can now be burned as fuel. The remaining liquids of the aqueous layer and solids are further separated by filtering at step 13 for discharge of the filtered liquids and collection of solid by product for reclamation in step 15.

By way of further example, to properly dose the polythiocarbonate to remove the heavy metals from the waste oil, the following steps are performed:
1. ICP analysis of the waste oil;
2. Calculate the amount of 25% sodium polythiocarbonate (SPTC) needed from the formula:

$$(X)(Y)(0.04) = \text{MILLILITERS OF SODIUM POLYTHIOCARBONATE}$$

where
X = total ppm metals in oil
Y = gallons of oil
0.04 = a constant

For example, with 20 gallons of waste oil containing 20 milliliters per liter (ppm) of copper, the amount of 25% sodium polythiocarbonate solution to be added is determined as follows:

$$\text{ml 25\% SPTC} = (20 \text{ ppm Cu}) (20 \text{ gallons}) (0.04) = 16 \text{ ml}$$

3. Add to 20 gallons of water, 16 ml of 25% SPTC solution to add to the waste oil;
4. Stir
5. Let layers separate.
6. Skim oil.
7. Filter out precipitate metals from the aqueous layer.
8. If desired, another ICP analysis of the oil may be performed prior to burning or other disposal. Steps 2-8 can be repeated, if required.

As modifications to the foregoing may be made without departing from the spirit and scope of my invention, what is sought to be protected is set forth in the appended claims.

I claim:
1. The method of treating liquids containing dissolved heavy metals comprising the steps of:
   forming a solution of sodium polythiocarbonate by mixing sodium sulfide with water to completely dissolve said sodium sulfide;
   mixing said dissolved sodium sulfide with carbon disulfide to form a solution of sodium trithiocarbonate;
   adding sulfur to said solution and mixing at 50°-160° F. until completely reacted into a solution of sodium polythiocabonate;
   adjusting the pH of said liquid to 5.0±0.5;
   precipitating said dissolved heavy metals from said liquid by intermixing the sodium polythiocarbonate with said liquid until a one to two milligram per liter excess of sodium polythiocarbonate occurs to produce a liquid containing precipitated metallic solids including said heavy metals;
   maintaining said excess of sodium polythiocarbonate for 10-20 minutes; and
   separating said precipitated metallic solids from said liquid.

2. The method of treating wastewater containing dissolved heavy metals comprising the steps of:
   forming a solution of sodium polythiocarbonate by mixing sodium sulfide with water to completely dissolve said sodium sulfide; mixing said dissolved sodium sulfide with carbon disulfide to form a solution of sodium trithiocarbonate; adding sulfur to said solution and mixing at 50°-160° F. until completely reacted into a solution of sodium polythiocarbonate stirring the wastewater; adjusting the pH of the wastewater to 5.0±0.5; automatically intermixing a volume of said solution of sodium polythiocarbonate into the wastewater; determining the volume of the sodium polythiocarbonate to be intermixed by inserting an electrode into the intermixed solution and generating an electrical signal proportional to the concentration of free dissociated polthiocarbonate ions in said intermixed solution wherein said intermixing is continued until a one to two milligram per liter excess of sodium polythiocarbonate occurs; maintaining said excess of sodium polythiocarbonate for 10-20 minutes to form a precipitate including said dissolved heavy metals; and separating said precipitate from said wastewater.

3. A method of removing dissolved heavy metals from waste oil comprising the steps of:
   forming a solution of sodium polythiocarbonate by mixing sodium sulfide with water to completely dissolve said sodium sulfide; mixing said dissolved sodium sulfide with carbon disulfide to form a solution of sodium trithiocarbonate; adding sulfur to said solution and mixing at 50°-160° F. until completely reacted into a solution of sodium polythiocarbonate adjusting the pH of a volume of waste oil containing dissolved heavy metals to 5.0±0.5; mixing said volume of waste oil with a volume of water and a volume of sodium polythiocarbonate; the volume of water being equal to the volume of sodium polythiocarbonate; determining the volume of water and sodium polythiocarbonate in accordance with the following:

$$(X)(Y)(0.04) = \text{MILLILITERS OF SODIUM POLYTHIOCARBONATE}$$

where
X = total ppm metals in oil
Y = gallons of oil
0.04 = a constant
rapidly mixing the solution of oil, water and sodium polythiocarbonate to precipitate said dissolved heavy metals; wherein said mixing is continued until a one to two milligram per liter excess of sodium polythiocarbonate occurs; maintaining said excess of sodium polythiocarbonate for 10-20 minutes; allowing the mixture to remain static to permit separation of the oil and the aqueos layer; and, filtering said aqueous layer to remove precipitated heavy metals therefrom.

* * * * *